No Model.) 2 Sheets—Sheet 1.
J. A. FORBES.
Soldering Machine.
No. 233,408. Patented Oct. 19, 1880.
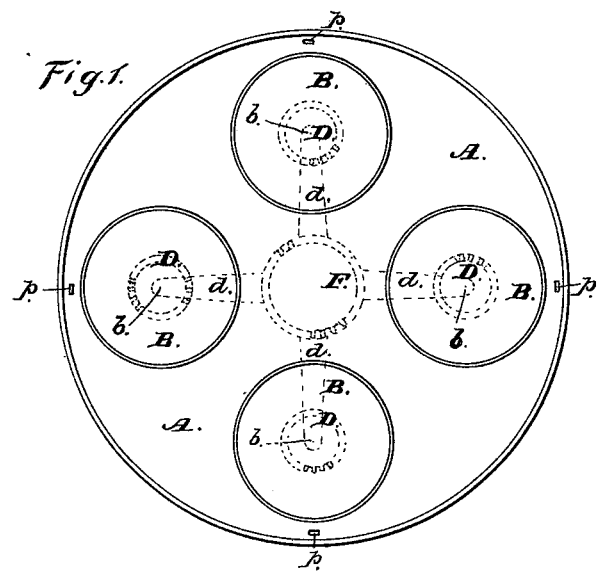
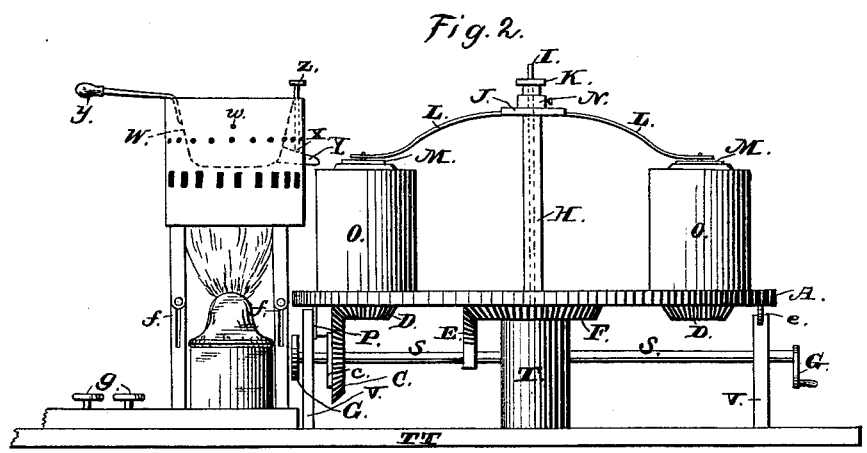
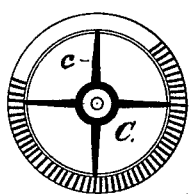
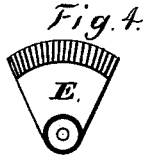
Witnesses:
Jas. E. Hutchinson.
Henry C. Hazard.
Inventor.
John A. Forbes
by F. A. Williams
Atty.

(No Model.) 2 Sheets—Sheet 2.
J. A. FORBES.
Soldering Machine.
No. 233,408. Patented Oct. 19, 1880.
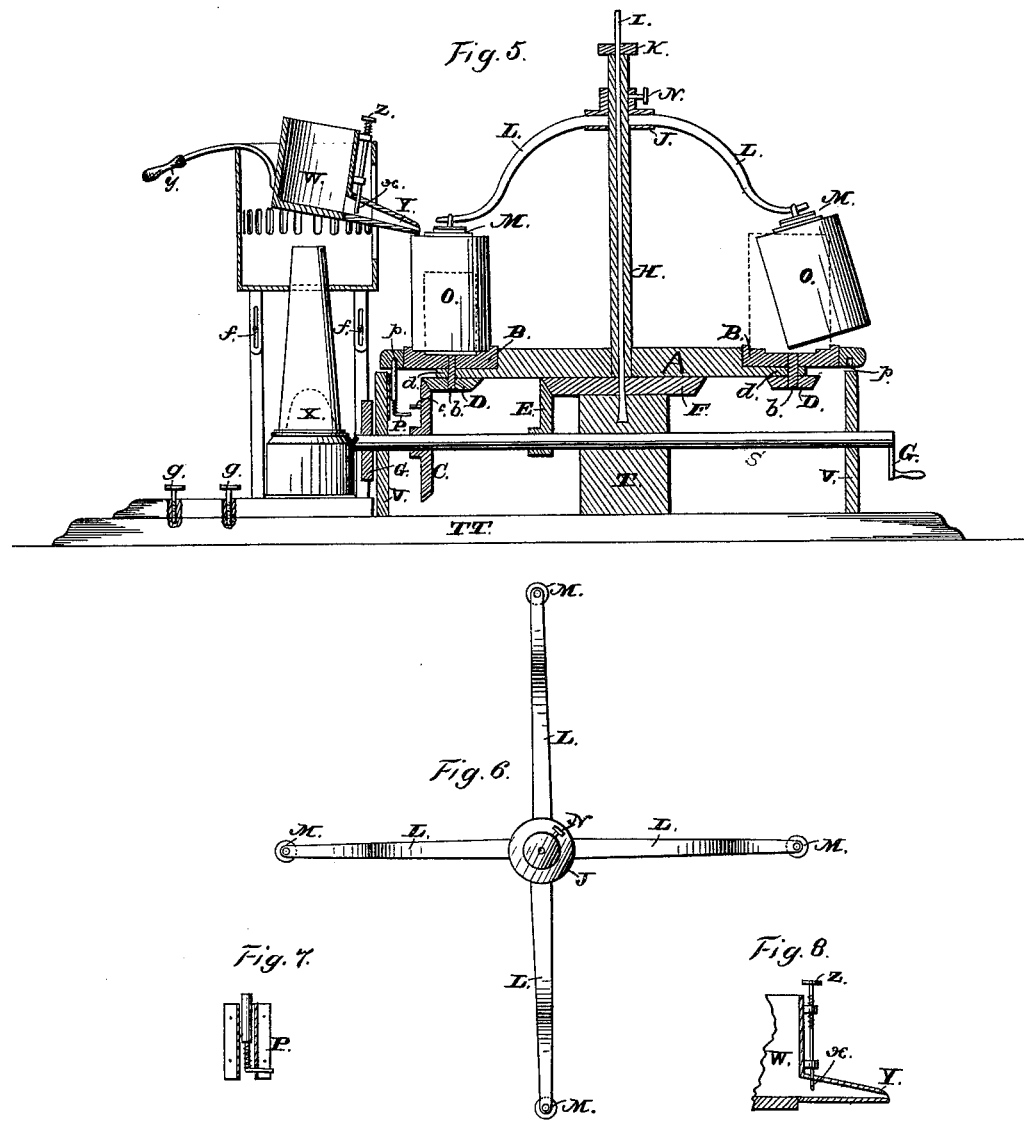

UNITED STATES PATENT OFFICE.

JOHN A. FORBES, OF DOVER, DELAWARE, ASSIGNOR OF ONE-HALF OF HIS RIGHT TO FREDERIC A. WILLIAMS, OF SAME PLACE.

SOLDERING-MACHINE.

SPECIFICATION forming part of Letters Patent No. 233,408, dated October 19, 1880.

Application filed July 31, 1880. (No model.)

*To all whom it may concern:*

Be it known that I, JOHN A. FORBES, of Dover, in the county of Kent and State of Delaware, have invented a new and Improved Soldering or Sealing Machine, which is fully set forth in the following specification, reference being had to the accompanying drawings.

My invention relates to the construction and arrangement of a machine for soldering or sealing all kinds of cans, tinware generally, and other packages.

My objects are, first, to provide a convenient and expeditious arrangement for holding in place the packages to be sealed and carrying them to and from the place of sealing; second, to provide machinery for the application of sealing material to the seam by moving the package instead of moving the sealing-instrument, as is usually done; third, to provide a stationary sealing-instrument by moving the seam against which the sealing is accomplished; and, fourth, the automatic delivery of the sealing preparation at the point of contact between the sealing-instrument and the seam.

Figure 1 represents a plan view of the disk A—a revolving table in the machine. Fig. 2 is an outside horizontal view of the machine.
Figs. 3 and 4 represent sectional wheels employed in the working of the machine. Fig. 5 is a vertical sectional view of the machine in the same position as in Fig. 2. Fig. 6 is a plan view of the adjustable collar and spring-arms, located in the machine above and parallel with the disk A shown in Fig. 1. Fig. 7 represents a spring-bolt for holding the disk A during the sealing operation. Fig. 8 is a horizontal side and sectional view of pot W and soldering-instrument Y, with their several parts and attachments.

In Fig. 1, A is a disk or table, a rotary movement of which is effected by gearing connecting with the cog-wheel F, attached to the under side of A. The minor disks B, for carrying the packages to be sealed, are rotated independently of A by gearing connected with the cog-wheel D, attached to the under side of B. B and D rotate upon a pivot, b, which is supported by the arms d, extending from the under side of A. There may be as many disks B as may be desired.

In Fig. 2 the same disk A is shown in a horizontal position resting upon the standard T and the table T T. The wheel F, for revolving A, is moved by the sectional wheel E, a face view of which is given in Fig. 4. The rotation of E produces a periodic movement and partial rotation of F and A, several rotations of E being necessary to produce a single rotation of F and A. The wheel D, for moving the disk B above, is operated by the sectional wheel C, a face view of which is given in Fig. 3. The cogs are removed from an arc of the wheel C equal to the whole arc of the wheel E. The two sectional wheels E and C are placed on opposite sides of the shaft S. The instant that E engages F to rotate the disk A the connection between C and D ceases for want of cogs on a portion of the perimeter of C. The above movement of A, effected by E and F, brings another wheel D into contact with the cogged portion of C, and D is now rotated by C, as before.

In Fig. 5 the packages O to be sealed are shown, one in position, the other being placed in position upon the disks B, which are shouldered to receive and hold packages of different sizes, as shown by dotted lines in O.

I is a rod firmly attached to the standard T, upon which the wheel F revolves, carrying with it the disk A, the sleeve H, and the arms L. Upon the sleeve H, near its upper extremity, is the adjustable collar J, from which the radiating spring-arms L extend to the top of the cans O to hold them firmly in position.

M is a small plate revolving freely on a pivot in L to lessen the friction with O. The pressure of M upon O may be regulated by adjusting the sliding collar J upon the sleeve H by means of the set-screw N.

The collar J, the springs L, and the plates M are represented in plan in Fig. 6, there being as many arms L as there are disks B.

K in Fig. 5 is a nut working upon the rod I and bearing upon H to regulate and steady the movement together of A, H, J, and L. P, an enlarged view of which is given in Fig. 7, is a spring-bolt attached to the standard V, locking the disk A by means of the slot p during the sealing operation. P is automatically withdrawn from the slot *p* by the clutch *c* on the wheel C just in time to permit the forward movement of the disk A.

G at each end of the shaft S is a crank or belt wheel for the application of a continuous power to the shaft S. It is understood that the alternate rotations of A and B result automatically from the alternate applications of E to F and of C to E without any assistance or interference by the operator.

On the left, in Fig. 5, is the pot W, containing the sealing material, to be kept molten by a lamp, X, or other heating apparatus beneath.

Y is a soldering-instrument of copper or steel, (more fully shown in Fig. 8,) attached to the lower edge of W, for the delivery and application of sealing material to the seams in the rotating packages O. Y is perforated to permit the flow of solder from W. The rod *x* in the side of W, and projecting vertically across the perforation in Y, constitutes a gate for regulating the flow of solder through Y, and is itself adjusted by the screw *z*. The pot W is swung upon the pivot *w*, (indicated in Fig. 2,) and the lower edge, carrying Y, may be projected or withdrawn by means of the lever *y* in the hand of the operator. W and Y may be adjusted vertically and horizontally by any suitable appliances at *f* and *g*.

The operation of the machine is as follows: Power being applied to G, the wheel C upon the shaft S engages the wheel D, causing the disk B to rotate, and with it the can O, which is held firmly down upon its seat by the pressure of the springs L. The operator now, standing near the pot W, places his hand upon the lever *y*, and, pressing downward, brings the point of Y into immediate contact with the seam in O while the can O is revolving. The solder or other sealing material flows through the aperture in Y, and, being thus delivered at and upon the seam in O, is applied thereto by the pressure thereon of Y, and the sealing operation is thus completed. The connection between the wheels C and D now ceases for want of cogs upon a portion of C, and with it the rotation of the disk B and the package O. The bolt P, by which the disk A was held in position during the above-described operation, is now immediately withdrawn from the slot *p* by means of the clutch or pin *c*, which is fast upon the wheel C. *c*, by the revolution of C, is brought into contact with a projection or lip on the side of the bolt P and withdraws P from the slot, and the sectional wheel E, then meshing with F, engages it and produces a partial rotation of A, bringing another, D, into connection with C and P, with another slot, *p*, in A, when the operation above described is repeated. An assistant upon the opposite side of the machine from the operator places the cans O upon the disks B before sealing and removes them when sealed.

What I claim is as follows:

1. In a soldering or sealing machine, the combination of the sectional wheel C with the wheels D and their shafts and the disks B in the rotating disk A, for producing an independent, intermittent, and automatic movement of the disks B.

2. In a soldering or sealing machine, the combination of the sectional wheels C and E and their shafts with each other and with the wheels D and F, to produce alternate rotary movements of A and B.

3. The combination, in a soldering or sealing machine, of the shaft S, the clutch *c* upon the segmental wheel C, the stationary part V, carrying the bolt P, and the disk A, having in it the slot *p*.

4. The combination, in a soldering or sealing machine, of the collar J with the springs L and the plates M, L and M to correspond in number with the disks B.

5. The combination, in a soldering or sealing machine, of the disk A and the disks B with the sleeve H, the collar J, and the springs L and plates M, as and for the purpose specified.

6. The stationary and adjustable perforated soldering-instrument Y, in combination with the pot W, the lever *y*, the gate *x*, and the intermittingly and automatically rotating disks A and B.

7. The combination of the perforated soldering-instrument Y with the independently and automatically rotating disks A and B and the wheels C, D, E, and F and their shafts.

Witness my hand this 29th day of July, 1880.

JOHN A. FORBES.

Witnesses:
ALEXANDER GOODWIN,
C. F. HAWKINS.